United States Patent [19]
Shimizu et al.

[11] Patent Number: 4,925,119
[45] Date of Patent: May 15, 1990

[54] METHOD AND APPARATUS FOR INSPECTING RESISTANCE TO FILM DRAW-OUT

[75] Inventors: Makoto Shimizu; Katutoshi Nakamura; Noriyuki Furusawa, all of Kanagawa, Japan

[73] Assignee: Fuji Photo Film Co., Ltd., Kanagawa, Japan

[21] Appl. No.: 353,440

[22] Filed: May 18, 1989

[30] Foreign Application Priority Data

May 18, 1988 [JP] Japan ................................ 63-121189

[51] Int. Cl.$^5$ ........................................... B65H 18/10
[52] U.S. Cl. ...................................... 242/57; 340/675
[58] Field of Search ................... 242/57, 55, 186, 191, 242/75.51, 71.1; 340/665, 668, 675, 677

[56] References Cited

U.S. PATENT DOCUMENTS

| | | | |
|---|---|---|---|
| 3,823,895 | 7/1974 | Jones et al. | 242/186 |
| 3,999,197 | 12/1976 | Iwashita et al. | 242/191 X |
| 4,483,492 | 11/1984 | Tokuda | 242/57 |
| 4,696,440 | 9/1987 | Harigaya et al. | 242/191 |
| 4,726,542 | 2/1988 | Nakayama et al. | 242/57 X |

Primary Examiner—John M. Jillions
Attorney, Agent, or Firm—Sughrue, Mion, Zinn, Macpeak & Seas

[57] ABSTRACT

A method for inspecting resistance to film draw-out comprises the steps of holding a magazine in which photographic film wound around a spool is accommodated, rotating the spool in the direction that winds up the film around the spool, detecting the movement of a film leader, which has been drawn out from the magazine, to the magazine, and measuring the force required to rotate the spool when the movement of the film leader is detected. An apparatus for inspecting resistance to film draw-out comprises a magazine holder, and a spool rotation device for rotating the spool in the direction that winds up the film around the spool. A rotating force measurement device measures the force required for the spool rotation device to rotate the spool, and a film movement detector detects the movement of a film leader, which has been drawn out from the magazine, to the magazine. A device receives the output of the film movement detector and samples the output of the rotating force measurement device when the movement of the film leader is detected by the film movement detector.

6 Claims, 1 Drawing Sheet

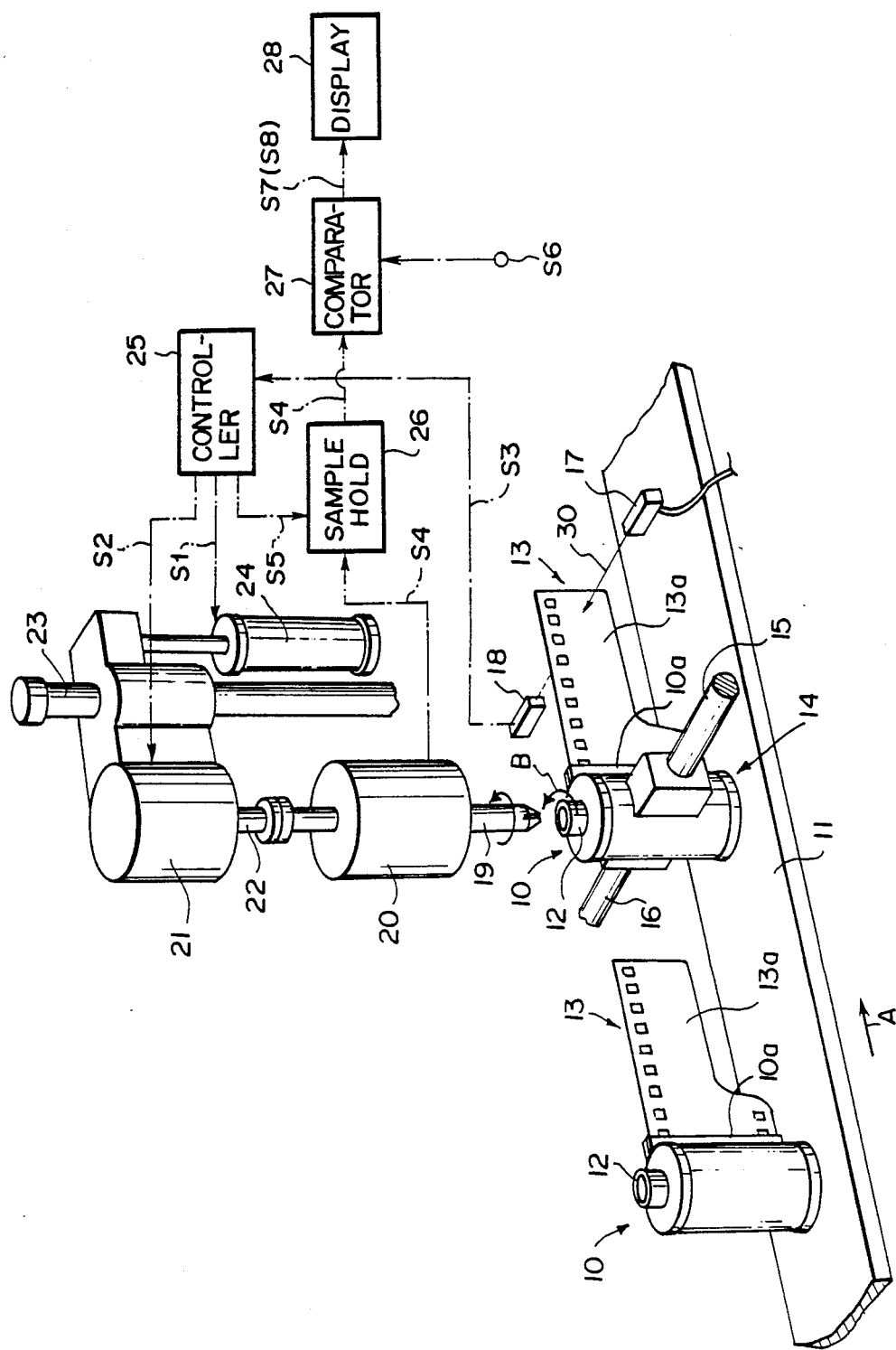

METHOD AND APPARATUS FOR INSPECTING RESISTANCE TO FILM DRAW-OUT

BACKGROUND OF THE INVENTION

1. Field of the Invention

This invention relates to a method for inspecting resistance exerted to photographic film accommodated in a magazine when the photographic film is drawn out from the magazine, and an apparatus for carrying out the method.

2. Description of the Prior Art

As is well known, photographic film such as 35 mm film is wound around a spool in a magazine and thus accommodated in the magazine for use in photographing in cameras. However, in cases where, for example, the spool and the magazine are not coupled correctly, large resisting force is exerted to the film when the film is drawn out from the magazine. If the resistance to film draw-out is very high the film would break when it is drawn out from the magazine and wound up around wind-up shaft of a camera. Therefore, after the film has been accommodated in the magazine in the film production process, the resistance to film draw-out has heretofore been measured in order to regard the magazine defective when the measured resistance to film draw-out is higher than a predetermined value.

One of the apparatuses for inspecting the resistance to film draw-out has been disclosed in, for example, Japanese Unexamined Patent Publication No. 58(1983)-71737. The disclosed apparatus holds a magazine, pulls a film leader, which has been drawn out from the magazine, in order to further draw out the film leader from the magazine, and measures the force required to draw out the film leader.

However, in many cases, the film has not been tightly wound around the spool in the magazine before the resistance to film draw-out is measured. Therefore, with the disclosed apparatus for inspecting resistance to film draw out, the spool does not often rotate when the film leader is drawn out from the magazine in order to inspect the resistance to film draw-out. As a result, during the inspection of the resistance to film draw-out, only the resistance to sliding of the film along the film outlet of the magazine is measured, and it is not possible to inspect whether or not the spool rotates lightly. In order to eliminate this problem, the film leader may be drawn out until the spool is rotated. However, in such cases, even the film portion which follows the film leader and which is to be actually used to take photographs is drawn out from the magazine, and therefore the film must be rewound around the spool after the resistance to film draw-out has been inspected.

SUMMARY OF THE INVENTION

The primary object of the present invention is to provide a method for inspecting resistance to film draw-out, wherein the resistance to film draw-out, including the resistance to spool rotation, is measured reliably such that the film need not be rewound into the magazine after the resistance to film draw-out has been inspected.

Another object of the present invention is to provide an apparatus for carrying out the method for inspecting resistance to film draw-out.

In the method and apparatus for inspecting resistance to film draw-out in accordance with the present invention, the resistance to film draw-out is inspected while the film is being wound up around the spool, instead of inspecting the resistance to film draw-out when the film is drawn out from the magazine.

Specifically, the present invention provides a method for inspecting resistance to film draw-out, which comprises the steps of:

(i) holding a magazine in which photographic film wound around a spool is accommodated, (ii) rotating said spool in the direction that winds up said film around said spool, (iii) detecting the movement of a film leader, which has been drawn out from said magazine, to said magazine, and (iv) measuring the force required to rotate said spool when the movement of said film leader is detected.

The method for inspecting resistance to film draw-out in accordance with the present invention is carried out efficiently by an apparatus for inspecting resistance to film draw-out, which comprises:

(i) a magazine holding means for holding a magazine in which photographic film wound around a spool is accommodated, (ii) a spool rotation means for rotating said spool in the direction that winds up said film around said spool, (iii) a rotating force measurement means for measuring the force required for said spool rotation means to rotate said spool, (iv) a film movement detecting means for detecting the movement of a film leader, which has been drawn out from said magazine, to said magazine, and (v) a means for receiving the output of said film movement detecting means and sampling the output of said rotating force measurement means when the movement of said film leader is detected by said film movement detecting means.

The force required to rotate the spool is at least equal to the sum of the resistance to sliding of the spool along the magazine and the resistance to sliding of the film leader along the film outlet of the magazine. Therefore, the force required to rotate the spool represents the resistance to film draw-out which resistance is exerted to the film when the film is drawn out from the magazine with the spool being rotated. In cases where the inspection of the resistance to film draw-out is begun with the film not being tightly wound around the spool, the film is wound up over a comparatively long length before the movement of the film leader is detected. This means that the slack film portion in the magazine is wound up around the spool, and does not mean that the film leader is drawn into the magazine over a long length. Therefore, after the resistance to film draw-out has been inspected, no operation need be carried out to draw out the film leader from the magazine.

With the method and apparatus for inspecting resistance to film draw-out in accordance with the present invention, in order to inspect the resistance to draw-out of the film accommodated in the magazine, the resistance to film wind-up is detected when the film is wound up around the spool and the movement of the film leader is detected. Therefore, the sum of the resistance to sliding of the spool along the magazine and the resistance to sliding of the film leader along the film outlet of the magazine can be detected reliably. Accordingly, with the present invention, resistance to film draw-out can be inspected substantially reliably. Also, since the resistance to film draw-out is inspected with the film being wound up around the spool, no operation need be carried out to rewind the film, which has been drawn out from the magazine, into the magazine after the inspection is finished, and the efficiency of the inspection is improved.

BRIEF DESCRIPTION OF THE DRAWING

The single drawing is a schematic view showing an embodiment of the apparatus for inspecting resistance to film draw-out in accordance with the present invention.

DESCRIPTION OF THE PREFERRED EMBODIMENTS

The present invention will hereinbelow be described in further detail with reference to the accompanying drawing.

Magazines 10, 10, subjected to inspection of the resistance to film draw-out are sequentially fed by a feeder (not shown) at predetermined intervals in predetermined orientations onto a conveyance means 11, and are conveyed by the conveyance means 11 in the direction indicated by the arrow A. A spool 12 is rotatably coupled with each magazine 10 and, by way of example, 35 mm photographic film 13 has been wound around the spool 12. A film leader 13a of the film 13 accommodated in the magazine 10 has been drawn out of a film outlet 10a of the magazine 10. The conveyance means 11 is stopped each time it has been moved by a distance equal to the interval between the adjacent magazines 10, 10. As a result, each magazine 10 is stopped at an inspecting station 14. After the magazine 10 is stopped in the inspecting station, magazine holding members 15 and 16 located on both sides of the conveyance means 11 are moved until they are located in light contact with the magazine 10 from both sides thereof, thereby to hold the magazine 10. At this time, the film leader 13a faces the downstream side as viewed in the direction along which the conveyance means 11 conveys the magazine 10. A photoelectric type film movement detecting means which is composed of a light emitter 17 and a light receiver 18 faces the film leader 13a. A spindle 19 is located above the magazine 10 which has been held in the manner described above so that the spindle 19 is coaxial with the spool 12 in the magazine 10. The spindle 19 is coupled with a rotation shaft 22 of a motor 21 via a torque meter 20. The motor 21 is supported so that it can be moved vertically along a guide 23 by an operating device 24 which may be constituted of an air cylinder or the like.

After the magazine 10 has been held in the inspecting station 14, a controller 25 feeds an operation signal S1 to the operating device 24 in order to operate the operating device 24 so that the motor 21 is moved down by a predetermined distance. Also, the controller 25 feeds an operation signal S2 to the operating circuit (not shown) for the motor 21 in order to operate the motor 21, thereby to rotate the spindle 19. When the motor 21 has been moved down by the predetermined distance, the lower edge of the spindle 19 is engaged with the spool 12. The operating device 24 is then stopped, and the spool 12 is thus rotated in the direction indicated by the arrow B. As a result, the film 13 is wound up around the spool 12. After the slack portion of the film 13 in the magazine 10 has been wound up tightly around the spool 12, the film leader 13a which is present at the position outside of the magazine 10 is drawn into the magazine 10. Before the film leader 13a is thus drawn into the magazine 10, light 30 emitted by the light emitter 17 is intercepted by the film leader 13a. After the film leader 13a is moved to the magazine 10, the light 30 is received by the light receiver 18. Upon receiving the light 30, the light receiver 18 generates a light reception signal S3, and the light reception signal S3 is fed as a signal, which represents the movement of the film leader 13a, to the controller 25. Upon receiving the light reception signal S3, the controller 25 feeds a sample holding signal S5 to a sample holding circuit 26, which receives an output S4 from the torque meter 20. At the same time, the controller 25 stops the operation of the motor 21.

As long as the spindle 19 is being rotated, the torque meter 20 continuously measures the force required for the spindle 19 to rotate the spool 12. The output S4 of the torque meter 20 which output is held as a sample at the time described above represents the force required for the spindle 19 to rotate the spool 12 while the film leader 13a is sliding along the film outlet 10a of the magazine 10. The output S4 of the torque meter 20 which has been held as a sample is fed into a comparator 27 and compared with a signal S6 which represents a predetermined value of the resistance to film draw-out. In cases where the force which the output S4 represents is smaller than the predetermined value of the resistance to film draw-out, which the signal S6 represents, a signal S7 is generated. In cases where the force which the output S4 represents is larger than the predetermined value of the resistance to film draw-out, a signal S8 is generated. The signal S7 or S8 is fed into a display means 28, which displays "OK" by way of example upon receiving the signal S7 and displays "NG" by way of example upon receiving the signal S8. Specifically, "NG" is displayed when the resistance to film wind-up is higher than the predetermined value, whereas "OK" is displayed when the resistance to film wind-up is lower than the predetermined value.

As described above, in the present invention, the resistance is detected when the film 13 is wound up into the magazine 10. The resistance thus detected includes the resistance to sliding of the spool 12 along the magazine 10 and the resistance to sliding of the film leader 13a along the film outlet 10a of the magazine 10. Therefore, the resistance thus detected represents the resistance to film draw-out which is exerted to the film 13 when the film 13 is drawn out from the magazine 10 during photographing. Accordingly, when the resistance to film wind-up is detected in the manner described above, it is possible to detect the resistance to film draw-out.

After the resistance to film wind-up has been inspected in the manner described above, the operating device 24 is activated in order to move the motor 21 to the position at which the spindle 19 disengages from the spool 12. Thereafter, the conveyance means 11 is moved by a distance equal to the interval between the adjacent magazines 10, 10, and the aforesaid inspection is repeated for the next magazine 10. In this manner, the inspection of the resistance to film wind-up is carried out automatically for all magazines 10, 10.

Before the motor 21 is rotated, the light emitter 17 and the light receiver 18 are located so that the light 30 impinges upon the portion of the film leader 13a, which portion is present at the position inward by a distance within the range of several millimeters to several tens of millimeters from the leading edge of the film leader 13a. With this configuration, the film leader 13a is stopped when it has been drawn into the magazine 10 by a length equal to the distance within the range of several millimeters to several tens of millimeters. Therefore, after the resistance to film draw-out has been inspected, the film 13 need not be wound up or unwound from the magazine 10, and the magazine 10 can be delivered directly as the product. As the means for detecting the movement of the film leader 13a, any known means such as a mechanical means may be utilized as well as the aforesaid photoelectric means.

In order to reliably achieve the engagement between the spindle 19 and the spool 12, the motor 21 should preferably be rotated at low speeds as long as the spindle 19 is being moved down.

Also, in the aforesaid embodiment, the comparator 27 is used, and the results of comparison of the measured resistance to film draw-out with the predetermined value are displayed on the displaying means 28. Or instead, the resistance to film draw-out which the output S4 of the sample holding circuit 26 represents may be displayed directly as a value, and the investigator may judge whether or not the value is acceptable. Furthermore, in the aforesaid embodiment, the output S4 of the torque meter 20 is held as a sample when the movement of the film leader 13a to the magazine 10 is detected. However, the sample holding circuit 26 may be omitted, the values measured by the torque meter 20 may be displayed sequentially, and the measured value may be read by the investigator when the film leader 13a moves to the magazine 10.

We claim:

1. A method for inspecting resistance to film draw-out, which comprises the steps of:
   (i) holding a magazine in which photographic film wound around a spool is accommodated,
   (ii) rotating said spool in the direction that winds up said film around said spool,
   (iii) detecting the movement of a film leader, which has been drawn out from said magazine, to said magazine, and
   (iv) measuring the force required to rotate said spool when the movement of said film leader is detected.

2. A method as defined in claim 1 wherein the movement of said film leader to said magazine is detected photoelectrically.

3. A method as defined in claim 1 wherein the results of the measurement of the force required to rotate said spool when the movement of said film leader is detected are displayed on a display means.

4. An apparatus for inspecting resistance to film draw-out, which comprises:
   (i) a magazine holding means for holding a magazine in which photographic film wound around a spool is accommodated,
   (ii) a spool rotation means for rotating said spool in the direction that winds up said film around said spool,
   (iii) a rotating force measurement means for measuring the force required for said spool rotation means to rotate said spool,
   (iv) a film movement detecting means for detecting the movement of a film leader, which has been drawn out from said magazine, to said magazine, and
   (v) a means for receiving the output of said film movement detecting means and sampling the output of said rotating force measurement means when the movement of said film leader is detected by said film movement detecting means.

5. An apparatus as defined in claim 4 wherein said film movement detecting means photoelectrically detects the movement of said film leader to said magazine.

6. An apparatus as defined in claim 4 further comprising a display means for displaying the results of measurement based on the sampled output of said rotating force measurement means.

* * * * *